Dec. 3, 1940.     N. C. PRICE     2,223,856
HIGH OUTPUT VAPOR GENERATOR FOR AIRCRAFT
Filed July 13, 1938     5 Sheets-Sheet 5
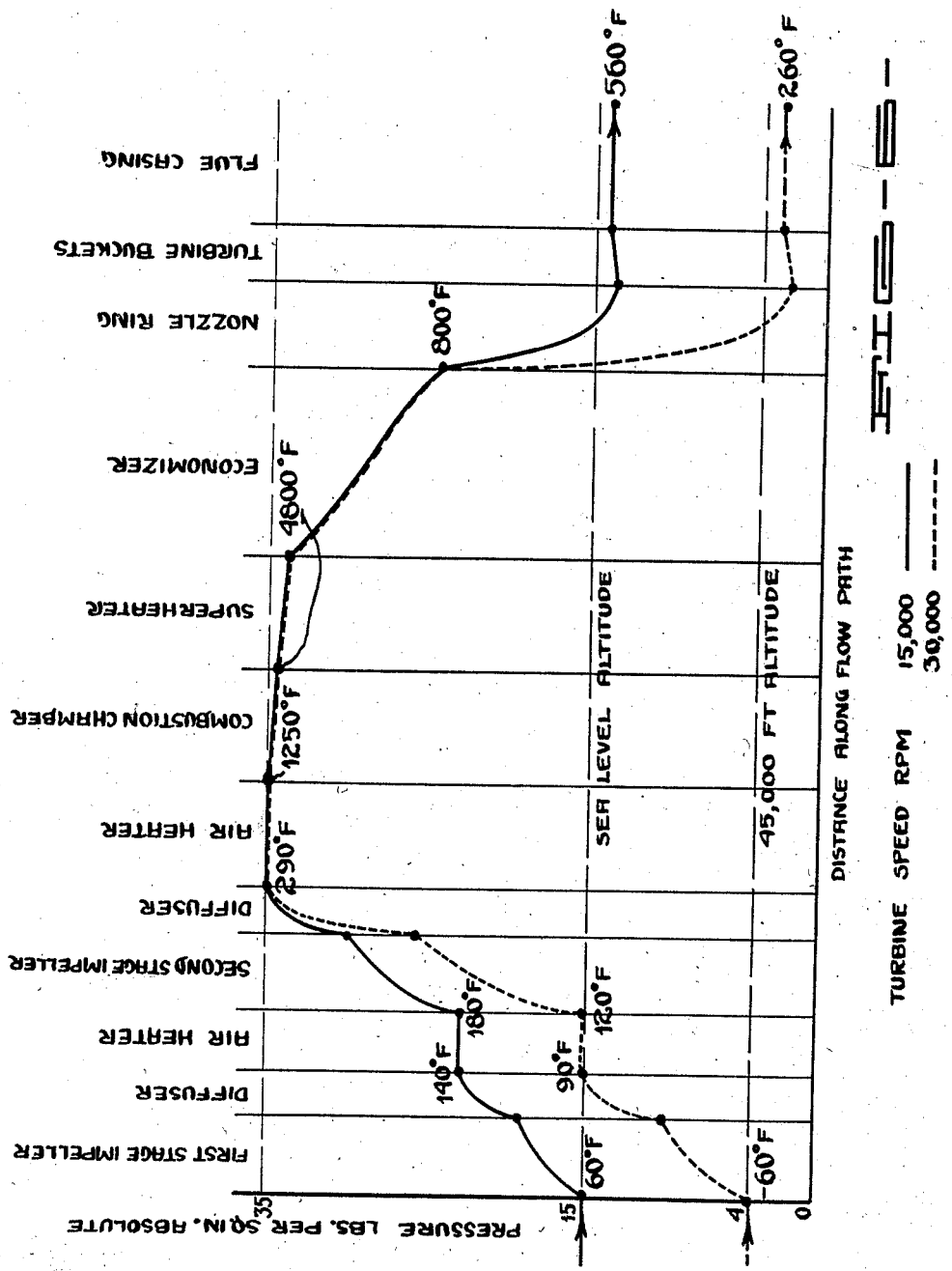
INVENTOR Patented Dec. 3, 1940

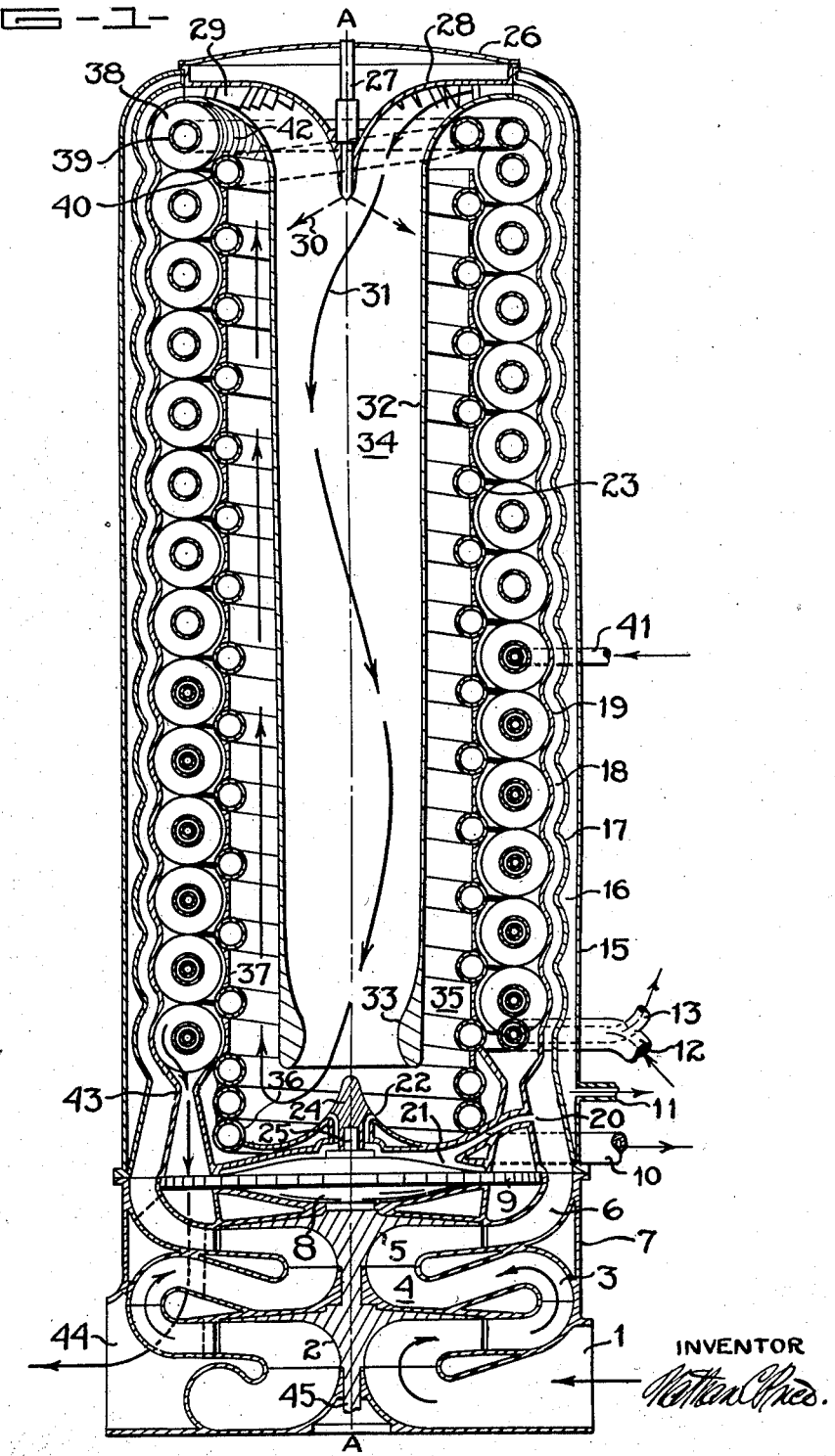

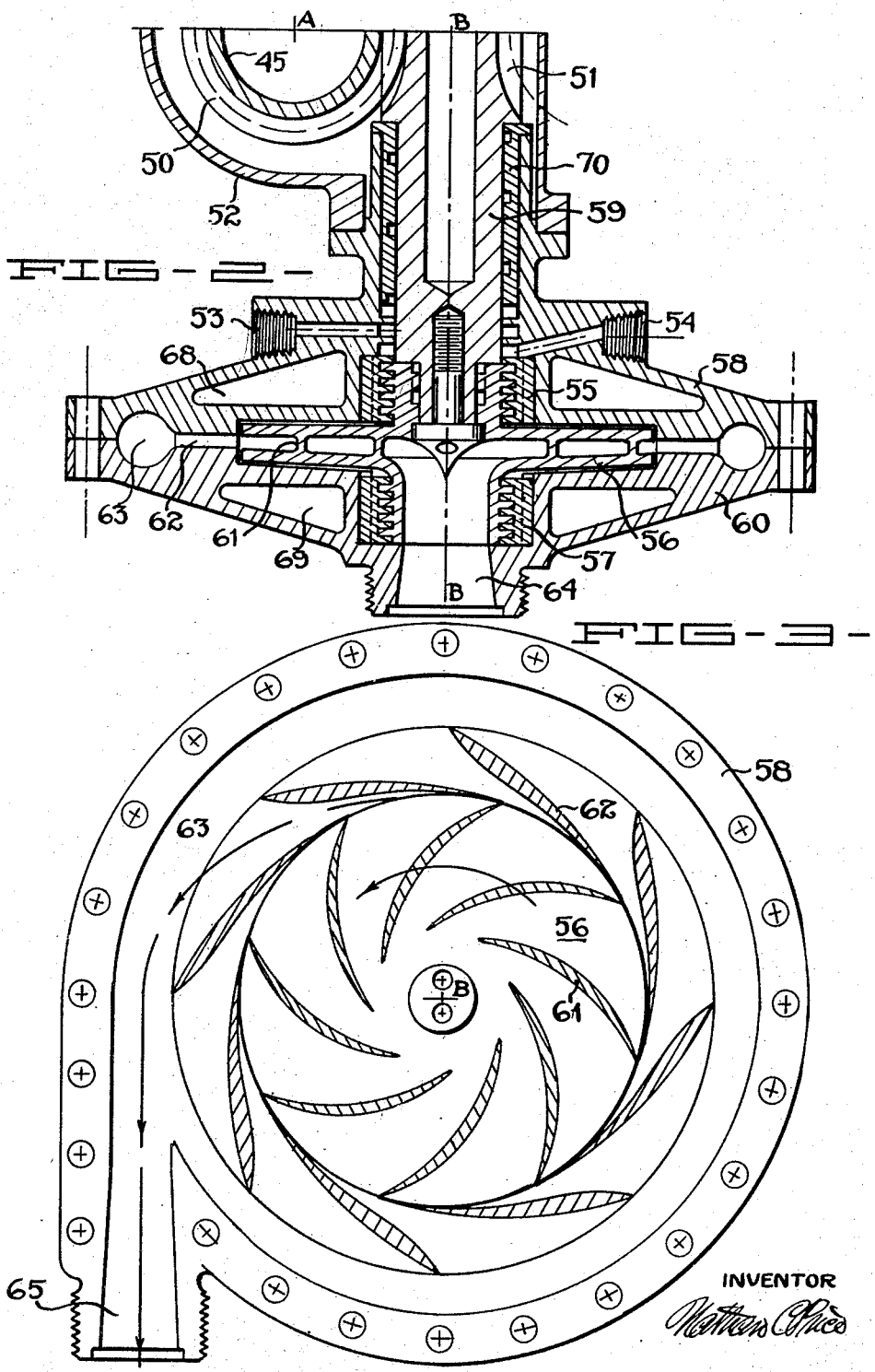

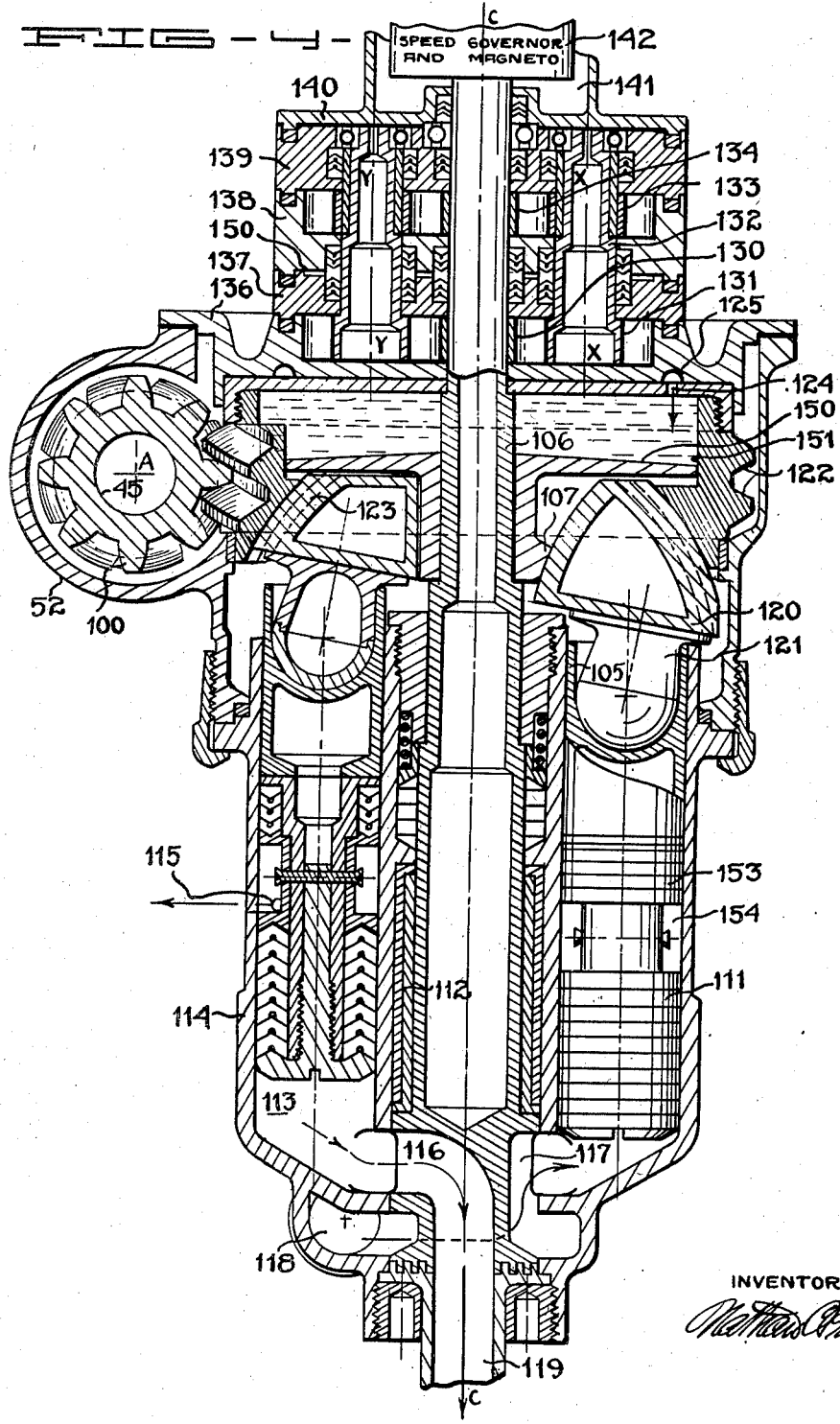

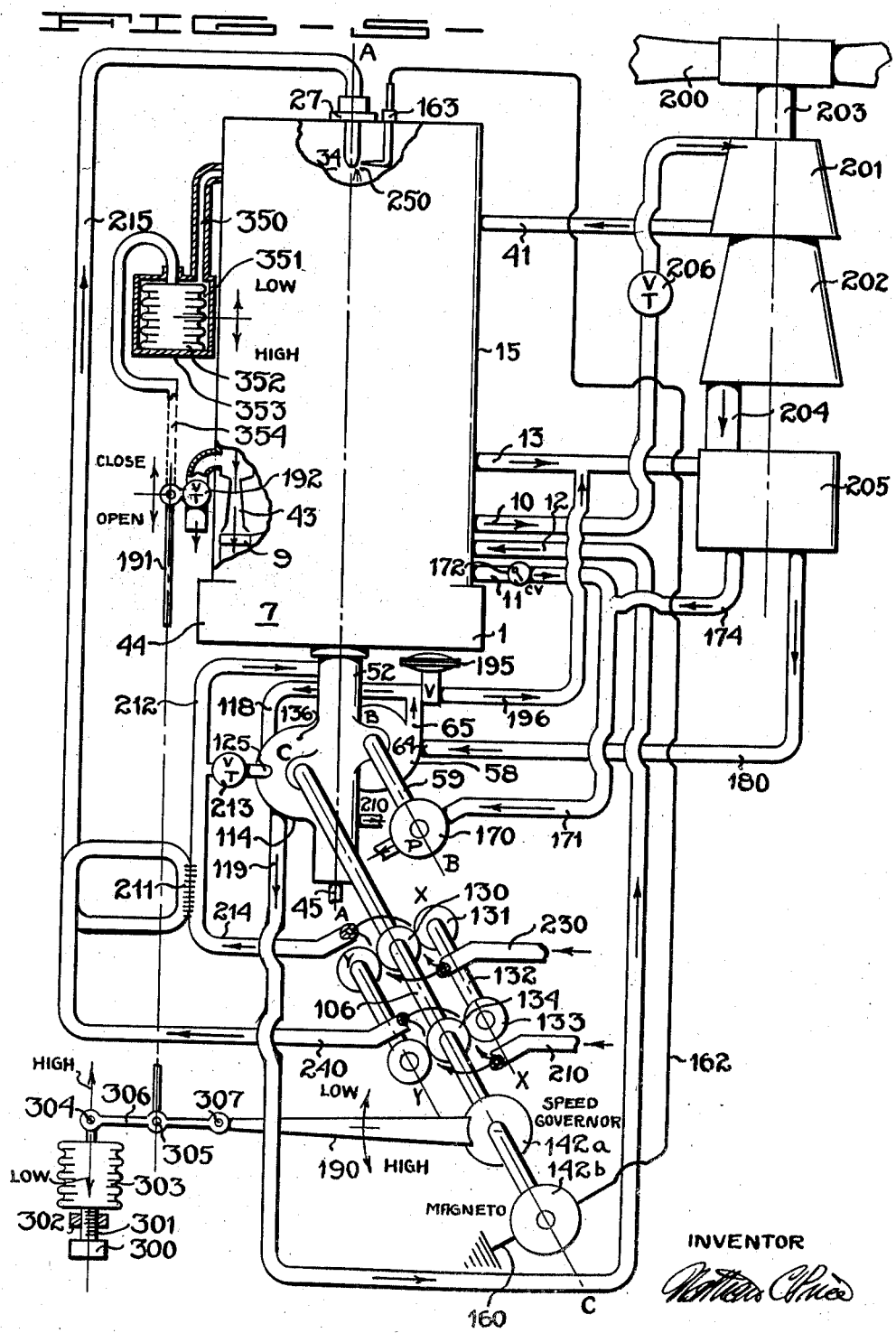

2,223,856

UNITED STATES PATENT OFFICE 2,223,856

HIGH OUTPUT VAPOR GENERATOR FOR AIRCRAFT

Nathan C. Price, Seattle, Wash.

Application July 13, 1938, Serial No. 218,942

3 Claims. (Cl. 122—451)

The invention primarily relates to vapor generators for use in aircraft, for in that application it is of the greatest importance to have power plants which are light, compact, and efficient. The invention satisfactorily meets these requirements and furthermore provides a type of vapor generator which is very flexible from performance standpoints and practically unaffected by change of operational altitude.

However the suitability of the generator is not limited to aircraft alone. It is of value for boats, locomotives, stationary power plants, and the like, but in the aircraft application its advantages become most fully realized.

Accordingly it is an object of the invention to provide a vapor generator capable of extremely high output notwithstanding the fact that the generator is very compact, light, and efficient.

It is an objective to supply a type of generator which incorporates an integral set of generation accessories related and constructed as to permit extremely high rates of fluid flow to be produced in the generation system for lightness and efficiency.

These and other allied objectives are indicated in the specification presented herewith and in which:

Figure 1 is a section through the principal axis of a representative form of the generator.

Figure 2 is a section through the axis of a feed pump of the generator. I prefer to call this mechanism a "loading pump" because it is used to charge a second stage feed pump of special form shown in section in Figure 4.

Figure 3 is a section through the impeller and diffuser of the loading pump.

Figure 5 is a diagrammatic representation of the functional relationships of the various elements of the vapor generator.

Figure 6 is a chart of pressures and temperatures of the combustion system of the generator.

Certain power plant auxiliaries such as the feedwater pump, fuel pump, lubrication pump, vacuum pump, and blower, ordinarily considered to be distinct and separate from the generator are in this instance classified as parts of the vapor generator, for they are actually built into the generation.

I have succeeded in producing a weight ratio of the complete steam generator of the identified type, below .35 lb. weight per power plant brake horsepower in a size suitable for a 5000 horsepower propulsion turbine. The compactness can also be illustrated by actual overall dimensions. The generator is about 24 inches in diameter and about 75 inches long in the specified case.

The generator air, combustion gas and vapor flow systems utilize velocities of high value. 1500 ft. per second velocity is representative. This results in a very high rate of heat transfer and in the most compact boiler structure, because the heat transfer surfaces are made many times more effective than in the ordinary vapor generator. The space required for passage of the air, gas, and vapor is very small because of the high rate of motion.

In general the heat transfer surfaces of the generator, the combustion chamber, the burner, the air preheater, the blower, the blower diffuser, and various other parts of the generator are constructed and interrelated in substantial accordance with the presentation of my copending patent Serial No. 120,188, filed Jan. 12, 1937, and entitled "Fluid heater."

The variation in air density with change of aircraft operational altitude requires a variable power for operating the boiler blower, which must be rotated faster at the higher altitudes. In the invention it is deemed preferable to maintain substantially constant combustion chamber pressure regardless of altitude, at each given power plant output. The generator of the described type is structurallly capable of withstanding the high internal combustion gas pressure and the very high rates of flow, because it is intrinsically pressure resistant due to its cylindrical shape. Furthermore the flow passages are so direct that very high velocities may be produced without excessive flow resistance.

At sea level the pressure in the combustion chamber may for instance be 35 lbs. per square inch absolute at full power, and at normal operational altitude where the atmosphere density is only a fraction of that at sea level the pressure in the combustion chamber is still maintained at approximately 35 lbs. per square inch absolute.

The power for operating the air blower for the boiler is largely or entirely derived from an exhaust gas turbine interposed between the final gas sweep of the economizer section and the atmosphere. At sea level a 10 lbs. per square inch pressure drop is sufficient for operating the turbine and the remaining 10 lbs. per square inch pressure drop is available for forcing the gases past the heat transfer surfaces. At altitude only 10 lbs. per square inch pressure drop for instance is again used for forcing the gases past the heat transfer surfaces, which allows a relatively large pressure drop for operating the gas turbine. Thus as the power and blower speed requirements become greater, the power available appropriately increases.

Due to the large expansion through the gas turbine, very low flue gas temperatures, as 260° F. for instance, are produced without necessity for large economizer section and without large air preheaters.

The combustion gas expansion in a turbine increases the efficiency of the power plant cycle for then the power for driving the generator accessory components need not be derived, or at least not be fully derived from the main working fluid being generated in the boiler tube.

The utilization of power of the gas turbine at the boiler combustion gas outlet likewise permits a high degree of working vapor regeneration. High temperature flue gases are then no longer released to the atmosphere by virtue of high feedwater temperature (as a result of regenerative feedwater heating) because the gases are expanded and cooled in the gas turbine, after leaving the economizer section.

The invention furthermore eliminates the disadvantageous aspects of high degree feedwater heating by incorporating the feedwater heater or heaters within the tubing of the boiler economizer section, and not separate from the boiler. Thus the feedwater enters the boiler at a comparatively low temperature and recovers heat simultaneously from the flue gases and from the bled vapor from an intermediate stage of the main propulsion turbine.

This arrangement of feed water heating and the employment of the exhaust gas turbine permit regeneration and feedwater heating up to 850° F. for instance, yet maintain high boiler efficiency and small boiler size. The regenerative vapor cycle improves overall power plant efficiency when boiler efficiency is unimpaired by its use, and due to the amount of steam bled off from the vapor turbine at one or more portions, the actual qauntity of outlet vapor to be condensed and therefore the size of the vapor condensers is greatly lessened.

Using steam as a working fluid, an outlet vapor temperature of 1250° F. and pressure of 3200 lbs. per square inch may be produced in the generator without difficulty arising from the use of such high temperature and pressure. The efficiency of the working vapor cycle is therefore not limited practically by boiler construction.

The use of circular fins on the economizer tube helix makes it capable of withstanding great pressures, and the fins increase the effective gas swept area for efficient heat absorption. The economizer fins are shrouded so that the gases of combustion must pass between the fins to remove stagnant gas areas. The shrouding of the fins also prevents change of cross sectional flow area offered to the gases as they progress from one loop of the tube helix to the next, reducing the ratio of flow resistance to heat transmission.

A further modification which improves the efficiency of the generator and decreases structural weight is embodied in an arrangement for evacuating the insulation space of the generator casing by a vacuum pump, or in particular by the vacuum pump for the power plant condenser.

The condenser and the casing are, for instance, maintained at about 2 inches mercury absolute pressure. The rarified air within the casing insulating space is essentially non-conductive.

Due to the high boiler working pressure and circulation the feed pump must deliver in the representative case at least 3200 lbs. per square inch pressure. Attainment of such pressure by means of a centrifugal or velocity type pump would require a number of high speed impellers in series. The viscous losses would be great and the efficiency of the pump low as a result. Due to the large number of stages and to the high peripheral velocity of each impeller, the water in the pump would become considerably heated by pump losses, and the water could not be heated in the desired way by bled off working vapor from the turbine. Furthermore the pump would be massive.

A reciprocating pump is likewise disadvantageous from size and weight standpoints.

In the invention the feed pumping system of the vapor generator is composed of two separate but intimately related pumping elements, a first of the centrifugal type, and a second of the positive displacement reciprocating plunger type, combined to realize the advantages and none of the disadvantages of each.

In a co-pending application Serial No. 160,288 filed August 21, 1937, and entitled "Fluid forcing system" I have described a suitable positive displacement pump. This pump is comparatively light and compact and capable of discharging liquids at high pressure efficiently. However in a size large enough for a 5,000 horsepower plant the speed of operation is limited to 1,000 revolutions per minute for instance because of cavitational tendencies during the admission stroke, so great are the fluid accelerations involved.

Therefore I prefer to "load" this reciprocating pump, as would be necessary with any reciprocating pump and not merely with the type described, with liquid at about 300 pounds per square inch from a separate high speed centrifugal pump, in order to rotate the reciprocating pump at a speed even as high as 8,000 revolutions per minute without cavitation. The pressure from the centrifugal pump is effective in preventing vacuum formation or vapor formation in the positive displacement pump cylinders during the admission stroke, and indeed is sufficient to hold the pumping plungers against their rotating and oil pressure-adjustable actuating cam so that return springs are not necessary for the plungers. On account of the high speed of operation a comparatively small reciprocating pump may then be employed, and the utilization of the described pumping technique affords a weight ratio of as low as .003 pound pump weight per power plant horsepower output in an exemplary case, with a pump efficiency of over 90 percent.

Feedwater at 300 pounds per square inch pressure is readily provided for "loading" by a small single stage centrifugal pump operated between 22,000 and 45,000 revolutions per minute, for instance, although the pump efficiency is not high under the circumstances. Because the required pressure rise in the loading pump is not over about 10 percent that of the reciprocating pump the inefficiency is not a practical disadvantage, and ordinarily the feed water is not heated appreciably in the loading pump.

As an emergency measure to prevent overheating in the centrifugal pump, a by-pass duct controlled in opening by a thermostatic valve communicates between the discharge of the pump and the power plant working fluid exhaust condenser. The thermostatic valve opens at a predetermined temperature of the discharged fluid, below the saturation temperature, allowing an increase in rate of discharge from the centrifugal pump due to by-pass flow to the condenser. This arrangement resists temperature rise in the centrifugal pump, beyond the temperature setting, and is primarily of value to prevent vapor generation by fluid friction during occasions when the positive displacement pump is regulated through its oil pressure operated system for adjusting cam angle. This function is required on rare occasions such as when the power plant has been suddenly shut down to a comparatively low output, and the resultant pressure surge tendency in the vapor generator must be overcome by resorting temporarily to unusually low feed liquid flow.

The positive displacement pump is further modified over the cited "fluid forcing system" specification in regard to the method of valving the liquid entering and leaving the pumping cylinders. This novel method cooperates in the prevention of undue fluid friction tending to produce cavitation or vapor formation, for the valve is not operated as a result of hydraulic suction acting upon it as is the case when ordinary inlet check valves are used.

A shaft extends downward from the rotating pump plunger drive cam, between the grouped parallel pumping plungers and forms a single rotating port valve adjacent to the closed end of the cylinders for controlling the opening between each cylinder and the inlet and outlet ducts of the pump.

This valving method permits one valve to suffice for inlet and outlet control of all cylinders of the pump. Furthermore the rotary valve does not involve actual metal to metal contact at the valving ports. It is centralized by comparatively remote lubricated bearings permitting a small clearance, insufficient to allow appreciable fluid leakage, nevertheless the clearance is existent to prevent wear or sticking.

The oil supply system of the generator is combined in operative relationship with the fuel system and feedwater supply system of the generator.

Variation of feedwater supply rate is accomplished subject to demands or conditions in the generator by action of oil pressure upon the driving cam of the feedwater pump to change the cam angle and as a result the plunger stroke. The control is continuous and does not at any time interfere with the true harmonic motion of the pumping plungers following the rotating cam. The hydraulic oil supply simultaneously lubricates the working faces, gears, etc. of the accessory portions of the generator. Heat contributed to the oil by friction is salvaged by contribution to the fuel fed to the boiler, effecting a slight increase in plant efficiency.

The fuel is preferably fed to the burner nozzle at a pressure of about 250 lbs. per square inch. Because gear pumps are highly compact and suitable for operation at this pressure without objectionable slip, I prefer to use a gear pump for the fuel as well as for the lubricating oil system.

However fuel is a poor lubricant. Accordingly the invention combines the oil pump and the fuel pump structures so that gear tooth wear which might otherwise arise in the fuel pump due to the inadequate lubricating qualities of the fuel is eliminated. The oil pump and the fuel pump are constructed as superimposed units with common gear shafts so that torque is carried through the lubricating pump gears directly to the individual fuel pump gears, aligning the latter gears rotatively. No tooth pressure is delivered from one gear to the other in the fuel pump as a result.

The novel arrangement of the generator incorporating the generation accessories such as the blower, feed pumps, gas turbine, etc. in one end thereof produces the most direct interconnection of the flow systems, and a very rigid yet light structure withal. The axial shaft bearing the gas turbine, the blower impellers, and the driving gear for the remaining boiler accessories is rotated at high speed such as 15,000 revolutions per minute at sea level, and 30,000 revolutions per minute at altitude. The axial shaft permits perfectly symmetrical diffusers to be placed around the impellers, and a perfectly symmetrical turbine nozzle ring to discharge into the turbine buckets. This increases thermal efficiency of the blowers and turbine. Also the diffusers and the nozzle ring remain within the bounds of the boiler casing diameter simplifying boiler construction and decreasing overall dimensions.

The axial shaft is geared down to a relatively low speed shaft, at one fourth speed for instance, for the secondary feed pump, the oil pump, fuel pump, turbine speed governor, and magneto. A powerful and compact worm gear arrangement is provided by having the shafts placed normal to each other. The accessories are pancaked one on top of the other along the slow speed shaft providing compact and rigid interconnection, also conforming generally to the external cylindrical form of the vapor generator casing, and yet each accessory is readily removable from the boiler without disassembly thereof.

The superimposition of accessories along the normal shaft facilitates driving these several units with only one gearset and with a minimum amount of driveshaft. The 4 to 1 gear reduction is readily accomplished in small space by the worm gearset, preferably of the cone type.

A companion gearset on the axial shaft drives a second normal shaft providing compact high speed drive of 1½ to 1 for instance for the loading pump impeller.

In Figure 1 the generator is shown in section along its axis. Air for combustion enters an inlet 1 of a centrifugal blower impeller 2 for a first stage compression and is reversed in a diffuser 3 to reenter an inlet 4 of a centrifugal blower impeller 5 for a second stage compression. The impellers 2 and 5 are rotatively joined to a gas turbine wheel 8 and to a drive shaft 45 along a common axis A—A of the generator.

A boiler casing 15 and a flue casing 7 join end to end to form an elongated cylinder to support the diffuser 3 of the impeller 2 and a diffuser 6 of the impeller 5. The shaft 45 is borne in the casing 7 by means of the diffusers 3 and 6.

Compressed air from the diffuser 6 is conducted along an annular preheater passage 18 bounded by an inner cylindrical shell 19 and an outer cylindrical shell 17, in the direction of some vanes 29 of a boiler end cover 28. The air reverses in direction against the cover and passes into an axial and cylindrical combustion chamber 34.

Fuel is injected into the chamber 34 by an axial nozzle which pierces the cover 28 and casing end lid 26 thereof, and this fuel nozzle 27 forms a conical spray 30 for mixture with the incoming air. The fuel is burned as it progresses within a combustion shroud 32 bounding the chamber 34. Adjacent to a discharge lip 33 of the shroud 32 another reversal of flow takes place. The burning charge is deflected from an end cone 24 and passes back around the exterior of the shroud 32 and along an axial helical tube superheater 23, within an annular space 35.

The superheater helix is constructed of spaced loops of a tube 40, but the space between the loops is filled by a helical strap 37. The strap 37 is bonded to the tube 40 so that heat may flow from the strap to the tube thereby increasing the effective heat absorbing surface of the tube. The strap therefore allows a reduction in the weight of the superheater and furthermore acts as an excellent stiffener and support for the tube 40 along its length preventing harmful tube vibration. Yet the strap is able to expand longitudinally and radially with the tube during temperature changes. Finally the combination of the helical tube and the strap form an imperforate barrier to guide the gases of combustion within the space 35 in the direction of a boiler economizer 38.

At a region 36 of the superheater and adjacent to the lip 33 it is preferable to crowd the loops of the tube 40 and to eliminate the strap altogether at this point, for in the vicinity of the combustion chamber outlet the gas temperatures run relatively high and the heat pickup of the superheater is so great at this location that an extension of the heating surface is unwarranted or undesirable. At the region 36 the loops of the tube 40 are welded together and are welded or bonded to the edge of the cone 24.

The heat contribution of the gases of combustion to the economizer is accomplished by penetration of the gases between some circular transverse fins 42 of the helical tube 39 of the economizer 38. The gases are laterally restrained to pass between the fins by the surrounding shell 19 and by the superheater 23 which is closely encompassed by the economizer 38. The shell 19 is corrugated to conform to the circular shape of the fins. The superheater 23 is also in effect corrugated to conform to the peripheral form of the fins because the strap 37 is thinner than the diameter of the tube 40 yet wound at the same pitch diameter. The tube 40 and the tube 39 are provided with the same helical pitch and staggered so that the strap 37 may abut the fins 42.

The gases of combustion having swept and heated the economizer next expand in a turbine nozzle ring 43 attaining high velocity therein. The gases strike against some buckets 9 of the wheel 8, rotate the wheel, and drive the shaft 45. The spent gases from the wheel are conducted within the casing 7, and in thermal contact with the diffusers 6 and 3, to an outlet flue 44.

A method of cooling the wheel 8, and of cooling a turbine bearing 25 is embodied in an air by-pass duct 20, in a cooling space 21 adjacent to the wheel, and in a plurality of spill holes 22 of the cone 24. This comprises a flow system for relatively cool air to pass from the diffuser 6 to the space 35. During its passage the air absorbs heat from the wheel and the bearing by thermal contact and enters the space 35 in highly heated condition to combine with unburned fuel particles which have impinged upon the cone 24.

Insulation of the boiler casing is accomplished by evacuation of a space 16 bounded by the shell 17 and the casing 15, through a vacuum duct 11.

Feed liquid to be generated as working vapor is admitted at an inlet 12 of the economizer tube 39, transferred at the outlet end of the economizer to the superheater tube 40, and heated to 1250° F. for instance. The conditioned vapor issues from the superheater tube outlet 10 to be used in the main propulsion turbine.

The heating of the liquid in the economizer 38 is abetted by a vapor filled helical tube 41 housed within the economizer tube 39. The vapor for the tube 41 is extracted from an intermediate expansion stage of the power plant main propulsion turbine. After delivery of heat to the feed liquid, through the walls of the tube 41, the vapor becomes condensed as a result and issues as liquid from an outlet 13 adjacent to the economizer inlet 12.

The tube 41 is substantially concentric with the tube 40 and the working fluid being conditioned in the economizer 38 flows within the annular passage formed between the tubes.

In Figure 2 I have shown the loading pump in section along its axis B—B. An accessory housing 52 surrounds a worm 50 of the shaft 45, for driving a gear 51 of a shaft 59. The shaft 59 is located along the axis B—B, which is normal to the axis A—A, and is aligned in a bearing 70.

The shaft 59 revolves a centrifugal impeller 56 having vanes 61 for forcing the liquid from an inlet 64 through some diffuser vanes 62 into a scroll 63. The scroll 63 is defined by a lower pump body 60 and by an upper pump body 58. Some hollow chambers 68 and 69 are provided in the bodies for weight reduction. A labyrinth 57 retained in the body 60 engages the inlet flank of the impeller 56 to prevent transmission of pumped liquid back to the inlet 64.

A labyrinth 55 mating with the opposite flank of the impeller 56 and seated in the body 60 retards loss of pumped liquid out a leakage duct 54.

The body 58 is attached to the housing 52. A buffer duct 53 in the body 58 leads to the shaft 59 and separates the bearing 70 from the leakage duct 54. The duct 53 is supplied with compressed air to prevent intercontamination between the liquid in the duct 54 and the lubricant in the bearing 70.

Figure 3 is a section through the impeller and diffuser of the loading pump of Figure 2 taken normal to the axis B—B. The scroll 63 discharges liquid under pressure to an outlet 65 for transfer to the positive displacement feed pump.

In Figure 4 are illustrated in section along a common axis the reciprocating second stage feedwater pump, the oil pump and the fuel pump of the generator, mounted in tandem. Within the housing 52 a worm 100 of the shaft 45 drives a gear 122 of a shaft 106. The shaft 106 has an axis C—C normal to the axis A—A of the shaft 45.

The gear 122 rotates a planar face cam 120 about the axis C—C by means of a projecting rail 123 mating with the cam. The cam 120 is angularly adjustable with respect to the gear 122 for regulating the stroke of some plungers 105 clustered about the shaft 106 and having axes parallel to the axis C—C. Some pivotal segments 121 transmit thrust from the wobbling cam to the plungers.

The plungers 105 are provided with some oil packings 153, a seepage space 154, and some feed liquid packings 111 adapted to reciprocate harmonically within some cylinders 113 of a pump body 114 and to effect pumping action under influence of the cam 120. A duct 115 bleeds the space 154.

Feed liquid from the loading pump outlet 65 enters a chamber 118 under pressure. The shaft 106 is projected downward within the body 114 between the pump cylinders and within a lubricated bearing 112 for alignment. Adjacent to the chamber 118 the shaft 106 is slotted to form a liquid admission port 117 and a liquid discharge port 116. As the shaft 106 rotates the port 117 successively connects the chamber 118 to some of the cylinders 113 for liquid admission thereto. Simultaneously the port 116 registers with the remaining cylinders to effect a vent to a discharge duct 119 for expulsion of feed liquid at high pressure.

The port 116 bears fixed rotative phase relationship to the cam 120, so that some cylinders 113 are ported to the chamber 118 only while their respective plungers are riding down the cam and while there can be an increase of volume in these cylinders as these plungers follow the cam. In conformity with this arrangement the port 117 also is fixed rotatively with respect to the cam 120 so that communication between the remaining cylinders 113 and the discharge duct 119 is effected only as the corresponding plungers thereof rise upon the cam producing a compression in these cylinders.

The plungers 105 and the segments 121 are held in contact with the cam 120 as a result of fluid pressure in the chamber 118, which is sufficient to cause the plungers to follow the cam 120 even during its greatest angularity and speed of rotation.

The pump body 114 and a cover body 136 are attached to the housing 52. The angular trim between the cam 120 and axis C—C is determined by the elevation of a wedge 107 movable by a hydraulic piston 150 in an internal cylinder 151 of the gear 122. The piston 150 and the cam 107 are slidable along the shaft 106. The wedge 107 acts between the shaft 106 and the cam 120 to vary the angle of the cam. Thus oil pressure admitted to a groove 125 of the body 136 supplies an orifice 124 passing from the external surface of the gear 122 into the cylinder 151 to the upper side of the piston 150. Depending on the amount of pressure produced in the cylinder, the piston assumes one of an infinite number of positions between fully raised and fully lowered.

The greater the rate of oil admission to the groove 125, the further the piston 150 is depressed, lowering the wedge 107 and increasing the angularity of the cam, thereby increasing the output of the pump. Oil leakage past the piston 150 escapes into the housing 52 where it serves to lubricate the gears and various sliding surfaces contained therein.

Superimposed upon the cover body 136 which absorbs thrust of the gear 122 and of the cam 120, is an oil pump body 137. The shaft 106 extends upward from the gear 122 through the body 136 and the body 137. The shaft 106 rotates an oil pumping gear 130 between the body 136 and the body 137.

Superimposed upon the body 137 is a lower fuel pump body 138 and an upper fuel pump body 139. The shaft 106 protrudes upward through these latter bodies and revolves a fuel pumping gear 134 between the two.

The shaft 106 extends still further upward into a chamber 141 of a body 140 attached to the top of the body 139. Within the chamber 141 are located the governor and magneto assembly 142 actuated by the shaft 106.

An air gap 150 between the body 137 and the body 138 prevents undue heat transmission from the oil pump to the feed pump. Elevated temperature is present in the oil pump as a result of viscous friction within the housing 52. This heat is carried to the oil pump. Heating of the fuel pump would tend to cause vaporization of the fuel which is somewhat volatile. It is therefore advantageous to expel the heat of the oil into the fuel, not at the fuel pump, but beyond the fuel pump in a heat exchanger 211, shown in Figure 5, whence the heat can be carried along a fuel duct 215 to the fuel nozzle 27 for recovery in the vapor generator.

In Figure 4 some mating gears 131 are arranged about the gear 130 and mesh with the gear 130 between the body 136 and the body 137 to accomplish oil pumping. Tooth contact is employed between the oil pump gears because oil is a lubricant. The rotation of the mating gears 131 is projected upward by means of some shafts 132 extending through the body 137 and the body 138 to some similarly arranged mating gears 133 of the fuel pump, which mesh with the gear 134 between the body 138 and the body 139 to accomplish fuel pumping. However the fuel pump gears are constructed with greater clearance so as to engage without actual contact because the fuel pump gears are guided rotatively through the shaft 106 and the shafts 132 by the oil pump gears 131.

The axes X—X and Y—Y of the shafts 132 are parallel to the axis C—C.

In Figure 5 a diagrammatic representation of the vapor generator and associated power plant units is shown.

Conditioned working vapor from the generator outlet 10 passes to a high pressure turbine 201. A throttle valve 206 is located in the outlet 10 for control of the vapor supply to the turbine. From the tubine 201 a portion of the partially expanded vapor passes into a low pressure turbine 202 and the remainder to the regenerator tube 41 of the generator. The turbine 201 and the turbine 202 drive an airscrew 200 by a shaft 203.

Exhaust working vapor from the turbine 202 is conducted along a pipe 204 into a condenser 205. A feed liquid duct 180 supplies the inlet of the loading pump with condensed working vapor from the condenser 205. A vacuum pump 170 driven by the shaft 59 of the loading pump evacuates the space 16 of the generator heat insulating casing 15 and the condenser 105. Vacuum is produced in the duct 11 through a return check valve 172 and in a duct 174 communicating with the condenser 205, by a vacuum conduit 171 of the pump 170.

Ignition of the fuel in the combustion chamber 34 is accomplished by a spark 250 between the burner nozzle 27 and an electrode 163. The electrode is supplied high tension current along a lead 162 of a magneto 142b grounded by a lead 160. The magneto 142b and a speed governor 142a are revolved by the shaft 106.

A by-pass duct 196 forms a communication between the outlet 65 of the loading pump and the condenser 205. A thermostatic valve 195 in the duct 196 and adjacent to the outlet 65 ordinarily remains closed to prevent by-passing of feed liquid from the loading pump to the condenser. However if the temperature in the outlet 65 reaches a predetermined value of 200° F.

for instance, the valve 195 opens abruptly permitting liquid to flow along the duct 196 back into the condenser to be cooled. There is a consequent cooling of the pump due to the greater quantity of liquid fed to the pump along the duct 188.

For regulation of the pressure in the generator combustion chamber 34 there is provided a waste gate 192 for bleeding gases of combustion from the nozzle ring 43. As the gate 192 is opened gases of combustion tend to by-pass the turbine buckets 9 and to allow reduction of the speed of the turbine. But if the gate 192 be closed the buckets 9 receive a greater flow of gases of combustion from the nozzle ring 43 and the turbine speed is increased. The control of the gate 192, subject to sensitive devices to be described, is therefore capable of varying blower speed and of regulating the back pressure acting upon the gases of combustion leaving the economizer.

A representative method for controlling the gate 192 comprises an evacuated bellows 352 seated within a chamber 351 of a pressure casing 353. The casing 353 is connected to the combustion chamber by a duct 350. If the combustion chamber pressure tends to rise beyond a predetermined absolute pressure value, such as 35 pounds per square inch for instance, the bellows 352 becomes abruptly compressed and a link 354 extending out of the casing 351 from the free end of the bellows transfers the motion to the gate 192 effecting an opening thereof, to restore the combustion chamber pressure to its normal value.

However if the combustion chamber absolute pressure tends to drop below the predetermined normal chamber the bellows expands abruptly and the link 354 is thrust by the free end of the bellows in the opposite direction to close the gate 192. The closure of the gate 192 increases the back pressure acting upon the gases issuing from the economizer because then all or more of the gases of combustion must pass through the nozzle ring 43 which constitutes a definite flow restriction at any given supply pressure. The turbine is accelerated by the greater rate of gas passage through the ring 43 causing a greater pressure rise in the generator air blowers due to the greater operational speed thereof. The combination of the increased back pressure upon the gases issuing from the economizer, and the greater blower speed cause a restoration of the combustion chamber pressure to the normal value.

A second representative method for controlling the gate 192, which may be described in action by assuming that the dotted portion of the link 354 has been removed and that the link 354 no longer acts upon the gate 192, comprises a tie rod 191 from the gate to a middle pin 305 of a floating link 306 having an end 304 attached to an evacuated bellows 303, and an end 307 tied to the speed governor 142a by a lever arm 190.

Increase of operational altitude of the aircraft tends to cause the bellows 303 to expand abruptly raising the end 304 of the link 354, and consequently moving the rod 191 to close the gate 192. However as the speed of the gas turbine increases as a result of this closure, the speed governor 142a lowers the opposite end 307 tending to reduce the degree of closure of the gate 192. The points of attachment to the link 306 are spaced in a proportionality which produces a substantially constant absolute pressure in the combustion chamber 34 as the bellows 303 and the governor 142a compensate for change in atmospheric pressure and in turbine speed, during ascent of the aircraft.

As the aircraft descends the motion imparted to the link 306 is reversed due to collapse of the bellows and due to raising of the arm 190 by the governor. This maintains the combustion chamber absolute pressure substantially constant.

For regulation of the working vapor output of the vapor generator, there is provided an adjustment to the bellows 303, as also can be provided on the bellows 352, to allow the control of combustion chamber absolute pressure to be effected at a lower predetermined level, such as 25 pounds per square inch regardless of the operational altitude of the aircraft. This maintenance corresponds to low cruising power output at all altitudes and provides substantially constant cruising power. The adjustment embodies a threaded rod 301 supporting the stationary end of the bellows 303, mounted in a post 302 and rotatable by a knob 300, to cause a raising or lowering of the bellows as the case may warrant. Correspondingly the combustion chamber constant absolute pressure control level is raised or lowered. It is obvious that this control may be accomplished by automatic means brought to act upon the knob 300, as well as manual means, for conditions such as generator working vapor pressure or speed of the propeller 200 are available to effect an appropriate motor mechanism on the knob to maintain a predetermined disposition of such condition.

The vapor generator fuel flow system includes in addition to previously identified elements a supply duct 210 for feeding the fuel pumping gears 133 and 134, and a fuel duct 240 from the gears 133 and 134 to the heat exchanger 211.

In the oil flow system I provide an inlet duct 230 which may draw oil from a drain 210 of the housing 52 and which supplies the oil pumping gears 130 and 131. The oil is forced along a duct 214 to the heat exchanger 211. Beyond the heat exchanger the oil may travel under pressure in a line 212 into the housing 52. However the oil may shunt the line 212 past a variable throttling valve 213 into the groove 125 for controlling the position of the feedwater pump cam 120 and the liquid discharge rate of the positive displacement pump. The means brought to act upon the valve 213 affecting the oil flow and the generator feed liquid flow are not shown. However it is customary in the art of boiler control to regulate the rate of feed liquid supply in accordance with a generator condition such as pressure or temperature at a region of the boiler tube.

In Figure 6 a graph of fluid pressure ordinate values plotted against flow distance abscissal values is presented for the generator.

It is shown by a solid line representing sea level conditions and by a dotted line representing conditions at a pressure altitude of 45,000 ft., that combustion air for the generator is given hyper-adiabatic compressions in the first stage impeller and diffuser thereof followed by a temperature rise at constant pressure due to heat exchange with flue gases sweeping the diffuser. The process is repeated in the second stage blower with further hyper-adiabatic compressions in the second stage impeller and diffuser bringing the air to about 35 lbs. per square inch pressure and 290° F. temperature for instance. The air is then heated in the air preheater to about 1250° F. and is subsequently elevated to about 4800° F. in the combusion chamber by combination with fuel at constant pressure.

The gases of combustion sweep the superheater with relatively small attendant pressure fall, but in the economizer a substantial drop of pressure of about 10 lbs. per square inch results. In the nozzle ring an expansion is accomplished with drop of gas temperature to below atmospheric pressure. The gas temperature entering the ring is about 800° F. At sea level the gas temperature after expansion is approximately 560° F., while at 45,000 ft. altitude the temperature after expansion is about 260° F. due to the greater expansion afforded.

Within the turbine buckets there is a slight recompression or further expansion as the case may be. The initial pressure of the air entering the generator is somewhat greater than the pressure of the flue gases leaving the flue casing because air is generally supplied from a relatively high pressure region adjacent to the aircraft, and it is arranged to expel the gases of combustion into a relatively low pressure region adjacent to the aircraft.

Because the temperature of combustion within the boiler combustion chamber is very high, heat resistant material, such as carborundum, may be advantageously employed for the shroud 32 of Figure 1. However I have found that the temperature of the combustion shroud may be controlled to some extent in high velocity combustion chambers by special distribution of the fuel and air, characterized by arrangement for an unbalanced mixture ratio either too rich or too lean and therefore at a comparatively low temperature to come in contact with the shroud. It is for this reason unnecessary to cool the shroud with tube convolutions containing working vapor.

In Figure 1 the spiral course of the air and fuel flow along the combustion chamber diagrammatically signifies that rich portions of the fuel-air mixture are thrown centrifugally against the inner wall of the combustion chamber providing a relatively cool protective layer.

The numerical designations in the various figures of this specification are consistent throughout. I have endeavored to deal with representative forms of the invention, for the invention may be actually embodied in a variety of forms of similar character. It is intended that the claims presented herewith shall cover these various forms in the broadest sense.

I claim:

1. A vapor generation system comprising a once-through boiler tube swept internally by vapor at relatively high velocity and relatively high pressure, said tube being enclosed within a pressure-resisting casing and being swept externally by gases of combustion at high velocity within said casing, a gas turbine connected to said casing, a positive displacement pump for feeding liquid to said tube, a centrifugal type pump for loading said positive displacement pump said turbine driving said positive displacement pump and said centrifugal type pump, a device sensitive to temperature of the feed liquid, and means for said device to vary the relative rate of discharge of said change-of-velocity type pump with respect to said positive displacement pump.

2. A vapor generation system comprising a once-through boiler tube, a combustion space for heating said tube, a turbine operated by gases from said space, an auxiliaries shaft operted by said turbine, a variable discharge positive displacement pump for feeding liquid to said tube, a centrifugal type pump for feeding liquid to said positive displacement pump, said positive displacement pump and said centrifugal type pump being driven by said shaft, a device sensitive to thermal conditions in said centrifugal type pump, means for said device to vary the relative rate of discharge of said centrifugal type pump with respect to said positive displacement pump, said positive displacement pump having pumping plungers and a hydraulic adjustment for the stroke of said plungers, a first pumping gear set for supplying oil to actuate said adjustment, a second pumping gear set for supplying fuel under pressure to said space, some torque shafts extending between said first and said second gear sets and maintaining a fixed rotary phase relationship therebetween, and said auxiliaries shaft driving said torque shafts.

3. A flow system comprising a consumer requiring varying quantities of liquid at relatively high pressure, a positive displacement pump connected to said consumer, a fluid impeller of a type adapted to develop fluid pressure by rotational velocity connected to said pump, a liquid supply source connected to said impeller, a conduit bypassing said impeller, a flow control means in said conduit, and a device responsive to temperature of the liquid being discharged from said impeller for regulating said means.

NATHAN C. PRICE.